(12) United States Patent
Beigel et al.

(10) Patent No.: US 9,403,185 B2
(45) Date of Patent: Aug. 2, 2016

(54) IMPREGNATION OF AIR CORE REACTORS

(75) Inventors: Astrid Beigel, Steinen-Hollstein (DE);
Christian Beisele, Mullheim (DE);
Ulrich Massen, Rheinfelden (DE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 19 days.

(21) Appl. No.: 14/241,118

(22) PCT Filed: Jun. 27, 2012

(86) PCT No.: PCT/EP2012/062452
§ 371 (c)(1),
(2), (4) Date: Apr. 2, 2014

(87) PCT Pub. No.: WO2013/029832
PCT Pub. Date: Mar. 7, 2013

(65) Prior Publication Data
US 2015/0002254 A1   Jan. 1, 2015

(30) Foreign Application Priority Data

Aug. 31, 2011 (EP) .................................. 11179504

(51) Int. Cl.
| H01F 27/28 | (2006.01) |
| B05D 3/00 | (2006.01) |
| C08G 59/40 | (2006.01) |
| C08G 59/50 | (2006.01) |
| C08G 59/62 | (2006.01) |
| C08G 59/68 | (2006.01) |
| C09D 163/00 | (2006.01) |
| H01F 27/32 | (2006.01) |
| H01F 30/08 | (2006.01) |
| C08K 5/053 | (2006.01) |
| C08K 5/06 | (2006.01) |
| C08K 5/17 | (2006.01) |
| H01F 27/00 | (2006.01) |

(52) U.S. Cl.
CPC ............ *B05D 3/007* (2013.01); *C08G 59/4021* (2013.01); *C08G 59/504* (2013.01); *C08G 59/62* (2013.01); *C08G 59/686* (2013.01); *C08K 5/053* (2013.01); *C08K 5/06* (2013.01); *C08K 5/17* (2013.01); *C09D 163/00* (2013.01); *H01F 27/00* (2013.01); *H01F 27/28* (2013.01); *H01F 27/327* (2013.01); *H01F 30/08* (2013.01)

(58) Field of Classification Search
CPC ....... H01F 27/30; H01F 27/327; H01F 30/08; H01F 27/00; C08G 59/62–59/686
USPC ...................... 336/65, 83, 206–212, 233–234
See application file for complete search history.

(56) References Cited

U.S. PATENT DOCUMENTS 3,934,332 A * 1/1976 Trunzo .................. H01F 41/122
                                                                  267/225
3,974,302 A * 8/1976 Croop .................... B05B 15/04
                                                                  29/605
(Continued)

FOREIGN PATENT DOCUMENTS

| JP | S53-59798 | 5/1978 |
| JP | S60-69127 | 4/1985 |
| JP | S61-9439 | 1/1986 |

(Continued)

*Primary Examiner* — Tuyen Nguyen
(74) *Attorney, Agent, or Firm* — Monique M. Raub

(57) ABSTRACT

The invention relates to a process for the impregnation of air core reactors or parts of air core reactors and impregnated air core reactors or parts thereof obtainable by said process.

13 Claims, 4 Drawing Sheets

(56) References Cited

U.S. PATENT DOCUMENTS

Figure 1:
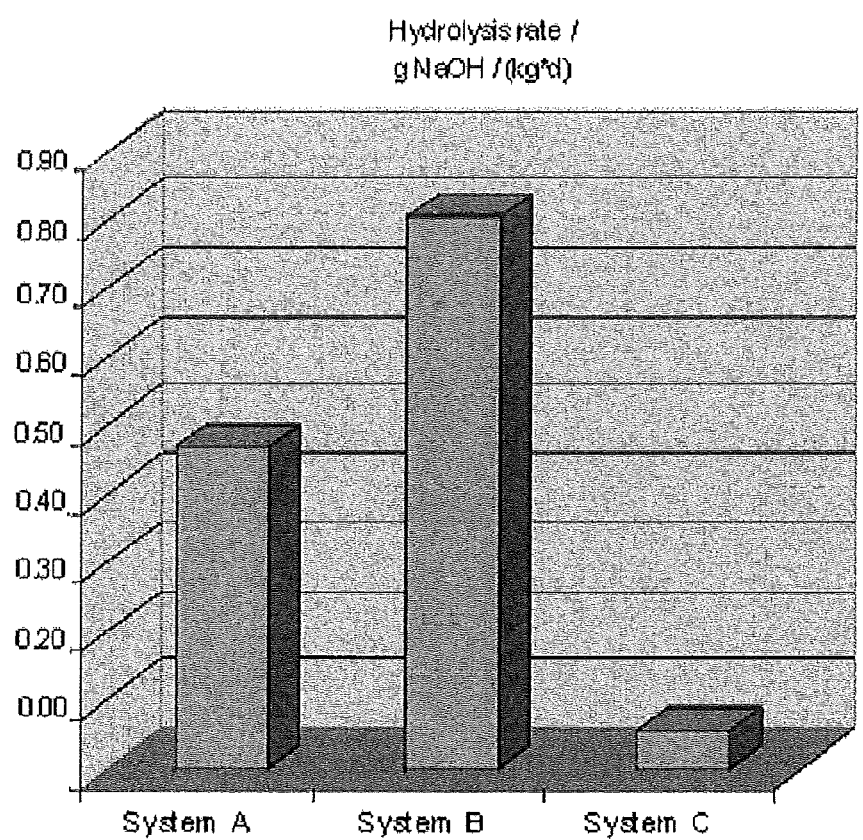

| | | | | |
|---|---|---|---|---|
| 4,100,118 | A | * | 7/1978 | Numata ................. C08G 18/58 523/458 |
| 4,918,801 | A | * | 4/1990 | Schwarz ................. H02K 3/32 264/272.2 |
| 5,461,772 | A | * | 10/1995 | Puri ..................... H01F 27/327 29/605 |
| 5,726,216 | A | * | 3/1998 | Janke .................... C08G 59/38 522/129 |
| 6,479,103 | B1 | | 11/2002 | Wichelhaus et al. |
| 6,555,601 | B1 | | 4/2003 | Behm et al. |
| 2009/0023855 | A1 | * | 1/2009 | Nakamura ........... C08G 59/302 524/540 |
| 2010/0018750 | A1 | * | 1/2010 | Schaal ................. C08G 59/226 174/137 B |

FOREIGN PATENT DOCUMENTS

| | | |
|---|---|---|
| JP | H05-271636 | 10/1993 |
| JP | H09-298118 | 11/1997 |
| RU | 2078093 | 4/1997 |
| WO | 99/16840 | 4/1999 |
| WO | 02/33011 | 4/2002 |
| WO | 2006/005559 | 1/2006 |

* cited by examiner

IMPREGNATION OF AIR CORE REACTORS

CROSS REFERENCE TO RELATED APPLICATIONS

This application is the National Phase of International Application PCT/EP2012/062452 filed Jun. 27, 2012 which designated the U.S. and which claims priority to European Patent Application (EP) 11179504.3, filed Aug. 31, 2011. The noted applications are incorporated herein by reference.

The invention relates to a process for the impregnation of air core reactors or parts of air core reactors and impregnated air core reactors or parts thereof obtainable by said process. Further, the invention relates to the use of an impregnation system for the impregnation of an air core reactor or parts thereof.

Epoxy resin curable compositions are well known in the art to provide excellent properties of cured material after application of said compositions to fibers. Epoxy resins are curable with for example acids and/or anhydride. Although these compositions are currently used for industrial applications some drawbacks are well recognized. The acid and/or anhydride cured system are often water-sensitive and lead to hydrolysis of the cured matrix. In addition, the application of curable epoxy resin compositions comprising anhydrids in a process for the impregnation of dry type air core reactors is associated with working hygiene issues. Dry type air core reactors can be coated by trickle impregnation and vacuum pressure impregnation. Large chambers are used and huge amounts of expoxy-anhydride systems are used at high temperatures. Therefore, a high amount of anhydride vapour is in the chamber and in the case of an incident the workers can be easily contaminated and the protection measures become very important. Further, air core reactors are used outdoor. Thus, they are exposed to high humidity and temperature changes from −40° C. to 150° C. during operations. Currently used systems are based on bis-phenol A epoxy/anhydride systems, which can be degraded by humidity especially under high temperatures. Additionally, the crack resistance of the currently used systems is weak and, as a consequence, during temperature changes cracks can occur and the humidity can penetrate even better and cause more severe damages.

It is the object of the present invention to provide a process for the impregnation of air core reactor or parts thereof, which overcome the drawbacks of the methods known in the prior art and mentioned above.

It has been found that the above identified problems can be solved by a specific method for the impregnation of air core reactors.

A first embodiment of the present invention is a process for the impregnation of air core reactors or parts of air core reactors comprising the following steps:

i) Providing an air core reactor or a part of an air core reactor, ii) Applying an impregnation system to the air core reactor or the part of the air core reactor wherein said impregnation system comprises a) one or more component(s) comprising one or more epoxy group(s), b) one or more flexibilizer, c) dicyandiamide; and d) one or more accelerator selected from the group consisting of imidazole, imidazole derivatives, urea derivatives and mixtures thereof, iii) Curing the impregnated air core reactor or the impregnated part of the air core reactor.

The term air core reactor, air core inductor and air core coil are used herein after synonymously. An inductor (or reactor, or coil) is a passive electrical component used to store energy in a magnetic field. The term air core reactor describes an inductor, that does not use a magnetic core made of a ferromagnetic material. The term refers to coils wound on plastic, ceramic or other non-magnetic forms, as well as those, that actually have air inside the windings. Air core coils have lower inductance than ferro-magnetic core coils, but are often used at high frequencies because they are free from energy losses which occur in ferro-magnetic coils. A side effect that can occur in air core coils in which the winding is not rigidly supported on a form is microphony: mechanical vibration of the windings can cause variations in the inductance.

According to a preferred embodiment the part of the air core reactor is a coil or a winding.

In step i) of the process of the invention an air core reactor or a part of an air core reactor is provided. According to a preferred embodiment of the present invention the air core reactor or the part thereof is pre-heated prior to the application of the impregnation system (step ii)). Preferably, the air core reactor or the part thereof is preheated to a temperature which is sufficient to ensure flowability of the impregnation system, more preferably to a temperature up to 110° C., further preferably up to 105° C. or up to 100° C. Good results can be achieved by preheating the air core reactor or parts thereof to a temperature ranging from 70° C. to 110° C., further preferably 80° C. to 105° C., especially 85° C. to 105° C. or 95° C. to 105° C.

However, during the application step ii) the temperature of the pre-heated air core reactor or the parts thereof can decrease, e.g. down to a temperature of about 40° C. to 80° C.

During the application of the impregnation system (step ii)) the temperature of the air core reactor or the part thereof ranges from 40° C. to 100° C., preferably 50° C. to 90° C.

In step ii) of the process of the present invention an impregnation systems is applied to the preferably pre-heated air core reactor or the parts of the air core reactor.

The impregnation system comprises a) one or more component(s) comprising one or more epoxy group(s), b) one or more flexibilizer, c) dicyandiamide; and d) one or more accelerator selected from the group consisting of imidazole, imidazole derivatives, urea derivatives and mixtures thereof.

The impregnation system is a composition comprising components a) to d). However, the impregnation system can also comprise separate compositions comprising one or more of the individual components a) to d) whereby said compositions are mixed prior to the application to the air core reactor or the part of an air core reactor.

Component a) of the impregnation system is a component comprising one or more epoxy group(s).

Suitable as component a) of the impregnation system is any type of epoxide that contains at least one glycidyl or α-methylglycidyl group, a linear alkylene oxide group or a cycloalkylene oxide group.

The epoxides can be used individually or as a mixture comprising two or more different epoxides.

Examples of suitable epoxy resins are polyglycidyl and poly(α-methylglycidyl)ethers obtainable by reaction of a compound containing at least two free alcoholic and/or phenolic hydroxyl groups per molecule with epichlorohydrin or α-methylepichlorohydrin under alkaline conditions, or alternatively in the presence of an acid catalyst with subsequent alkali treatment.

Suitable starting compounds for the preparation of such glycidyl or α-methylglycidyl ethers are, for example, acyclic alcohols, such as ethylene glycol, diethylene glycol and higher poly(oxyethylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol or sorbitol, cycloaliphatic alcohols, such as resorcitol, quinitol, bis(4-hydroxycyclohexyl)methane, 2,2-bis(4-hydroxy-cyclohexyl)propane and 1,1-bis(hydroxymethyl)cyclohex-3-ene, and alcohols having aromatic nuclei, such as N,N-bis(2-hydroxyethyl)aniline and p,p'-bis(2-hydroxyethylamino)diphenyl-methane.

Further suitable dihydroxy compounds for the preparation of glycidyl or α-methylglycidyl ethers are mononuclear phenols, such as resorcinol and hydroquinone, polynuclear phenols, such as bis(4-hydroxyphenyl)methane, 4,4-dihydroxydiphenyl, bis(4-hydroxyphenyl)sulfone, 1,1,2,2-tetrakis(4-hydroxyphenyl)ethane, 2,2-bis(4-hydroxyphenyl)propane (bisphenol A) and 2,2-bis(3,5-dibromo-4-hydroxyphenyl)propane, and novolaks, for example phenol and cresol novolaks.

Polyglycidyl and poly(α-methylglycidyl) esters are obtainable by reaction of a compound containing two or more carboxylic acid groups per molecule with epichlorohydrin, glycerol dichlorohydrin or α-methylepichlorohydrin in the presence of alkali. Such polyglycidyl esters can be derived from aliphatic polycarboxylic acids, e.g. oxalic acid, succinic acid, glutaric acid, adipic acid, pimelic acid, suberic acid, azelaic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid and 4-methyl-hexahydrophthalic acid, and from aromatic polycarboxylic acids, such as phthalic acid, isophthalic acid and terephthalic acid.

Further epoxides suitable as component a) are poly(N-glycidyl) compounds, for example the products obtainable by dehydrochlorination of the reaction products of epichlorohydrin and amines containing at least two amino hydrogen atoms, such as aniline, n-butylamine, bis(4-aminophenyl)methane and bis(4-methyl-aminophenyl)methane. Also included are triglycidyl isocyanurate as well as N,N'-diglycidyl derivatives of cyclic alkyleneureas, such as ethyleneurea and 1,3-propyleneurea and hydantoins, such as 5,5-dimethylhydantoin. Poly(S-glycidyl) compounds, for example the di-S-glycidyl derivatives of dithiols, such as ethane-1,2-dithiol and bis(4-mercaptomethylphenyl) ether, are likewise suitable.

Suitably the impregnation system comprise as component a) a cycloaliphatic epoxy resin or an epoxidation product of a natural unsaturated oil or a derivative thereof.

The term "cycloaliphatic epoxy resin" in the context of this invention denotes any epoxy resin having cycloaliphatic structural units, that is to say it includes both cycloaliphatic glycidyl compounds and α-methylglycidyl compounds as well as epoxy resins based on cyclo-alkylene oxides.

Suitable cycloaliphatic glycidyl compounds and methylglycidyl compounds are the glycidyl esters and α-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and α-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3ene, bis(4-hydroxycyclohexyl)methane, 2,2-bis(4-hydroxycyclohexyl)propane and bis(4-hydroxycyclohexyl)sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy6-methylcyclohexylmethyl 3',4'-epoxy-6'-methylcyclohexanecarboxylate, bis(3,4-epoxycyclohexylmethyl)adipate and bis(3,4-epoxy-6-methylcyclohexylmethyl)adipate.

Suitable cycloaliphatic epoxy resins are bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, and especially hexahydrophthalic acid diglycidyl ester and 3,4-epoxycyclohexylmethyl3',4'-epoxycyclohexanecarboxylate.

As component a) it is also possible to use epoxidation products of unsaturated fatty acid esters. It is suitable to use epoxy-containing compounds derived from mono- and polyfatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

Likewise, the epoxidation products of soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof may be used according to the invention.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a peracid, for example performic acid or peracetic acid.

Within the scope of the invention, both the fully epoxidised oils and the partially epoxidised derivatives that still contain free double bonds can be used as component a).

Suitable as component a) are epoxidised soybean oil and epoxidised linseed oil.

According to a further preferred embodiment component a) of the impregnation system is a compound having an average epoxy functionality of at least two.

According to a further preferred embodiment component a) of the impregnation systems is a polyglycidylether of a polyhydric alcohol, preferably polyphenol, especially preferably a polyglycidylether of bis-phenol-A or bis-phenol-F.

A further component of the impregnation system is the flexibilizer (component b).

The flexibilizer is preferably a liquid component at 25° C.

Suitable flexibilizers are polyamines or polyetherpolyamines. Likewise, suitable are the polyether-polyamines which can be obtained by reaction of polyethers with phosgene or thionyl chloride followed by amination to give the polyether-amine. The polyether-polyamines employed in accordance with the invention are commercially available (for example) under the name JEFFAMINE® (JEFFAMINE® is a Huntsman trademark), such as JEFFAMINE®, D400, JEFFAMINE® D2000, JEFFAMINE® T403, JEFFAMINE® T5000 and derivatives based on these JEFFAMINE® such as reaction products with epoxy resins. Other poly-etherdiamines based on ethylene or propylene glycol with lower molecular weight are available from BASF, e.g 4,7-dioxadecane-1,10-diamine or 4,7,10-trioxatridecane-1,13-diamine.

Especially preferred are liquid flexibilizer which do not react with the dicyandiamide during storage.

The flexibilizer are preferably selected from the group consisting of polyoxyalkylene, polypropylene glycol, polyethylene glycol, polytetrahydrofuran, with OH or amine end-group(s), acyclic alcohols, such as higher poly(oxyethylene) glycols, poly(oxypropylene)glycols, poly(oxytetramethylene)glycols, pentane-1,5-diol, hexane-1,6-diol, hexane-2,4,6-triol, Bis-(4-hydroxycyclohexyl)-methane, 2,2-Bis-(4-hydroxycyclohexyl)-propane and 1,1-Bis-(hydroxymethyl)-cyclohexene-3, arylalkylphosphate and phosphonate.

According to a preferred embodiment of the present invention component b) of the impregnation system is selected from the group consisting of polyoxyalkylenes, polyetherpolyamines and mixtures thereof. Especially preferred is polypropylene glycol or polyethylene glycol as a flexibilizer.

Component b) of the impregnation system is preferably present in an amount ranging from 40-70 wt. %, further preferably 50-70 wt. % and more preferably 50-60 wt. % based on the amount of the sum of components b), c) and d).

A further essential component of the impregnation system is dicyandiamide (component c). Preferably, the dicyandiamide is present in powder form, preferably having a weight averaged diameter ranging from 1 to 250 µm, more preferably ranging from 1 to 10 µm, determined by light scattering methods.

Component c) of the impregnation system is preferably present in an amount ranging from 25 to 45 wt. %, more preferably 25 to 40 wt. % and especially preferably 33 to 36 wt. % based on the amount of the sum of components b), c) and d).

A further essential component of the impregnation system of the present invention is the accelerator (component d).

The accelerator is selected from the group consisting of imidazole, imidazole derivatives, urea derivatives and mixtures thereof.

Suitable accelerators are imidazoles, such as, for example, imidazole, 2-ethylimidazole, 2-phenylimidazole, 1-methylimidazole, 1-cyanoethyl-2-ethyl-4-methylimidazole, 2-ethyl-4-methylimidazole or adducts of an imidazole with epoxy resin.

Another class of suitable accelerators are, for example, urea derivatives, such as N,N-dimethyl-N'-(3-chloro-4-methylphenyl)urea (chlortoluron), N,N-dimethyl-N'-(4-chlorophenyl)urea (monurone) or N,N-dimethyl-N'-(3,4-dichlorophenyl)urea (diurone), 2,4-bis(N',N'-dimethylureido)toluene or 1,4-bis (N',N'-dimethylureido)benzene. Commercially available products of this urone family are available as DYHARD® Urones from Evonic, e.g. DYHARD® UR 200, UR300, and UR 500 (DYHARD® is a trademark).

The above mentioned suitable accelerators are used alone or as a mixture thereof such as for example a mixture of an imidazole and an urone derivative.

Component d) of the impregnation system is preferably present in an amount ranging from 5 to 25 wt. %, further preferably 5 to 15 wt. % and more preferably 5 to 7 wt. %, based on the amount of the sum of components b), c) and d).

The amount of the epoxy component (component a) should be adapted to the other components b) to d). According to a preferred embodiment the weight ratio of component a) to the sum of components b), c) and d) (b+c+d) ranges from 20:1 to 2:1, further preferably 25:2 to 5:1, especially preferably 12:1 to 8:1, in particular 9:1 to 11:1.

According to a further preferred embodiment of the present invention the impregnation system is essentially free of anhydrides.

Further, it is preferred that the impregnation system is essentially free from components having carboxylic acid groups and/or ester groups.

Essentially free within the meaning of the present invention means that the component is present in an amount of less than 5 wt. %, preferably less than 2 wt. %, more preferably less than 0.5 wt. %, in particular less than 0.01 wt. %, for example 0 wt. %.

According to a preferred embodiment, the impregnation system is formulated in two parts generally with component a) in a first part and components b) to d) in a second part. In alternate embodiments the dicyandiamide can be dispersed in the expoxy containing component a) of the first part (composition A) or divided between the first part (composition A) and the second part (composition B).

Preferably, the impregnation system is applied as a two component system consisting of
A) composition A comprising at least component a) and
B) composition B comprising at least component b), c) and d).

Composition A and composition B are mixed prior to the application to the air core reactor or the parts thereof.

In step iii) of the process of the invention the impregnated air core reactor or the impregnated part of the air core reactor is cured.

Generally, the curing in step iii) of the process of the present invention is carried out at a temperature higher than 120° C., preferably at a temperature ranging from 135° C. to 155° C.

The time to cure the impregnation system depends on the coil size, and the wire dimension. Usually, curing is carried for a time up to 20 h, preferably 5 to 15 h.

According to a further preferred embodiment of the process according to the present invention, prior to the curing step gelation of the impregnation system is carried out, preferably at a temperature ranging from 100° C. to 120° C., more preferably from 100° C. to 110° C. The impregnation system reacts very slowly at ambient temperature (25° C.) and polymerization is triggered by raising the temperature. However, by raising the temperature to the final curing temperature it may happen that the reaction is strongly exothermic (i.e., releases heat) in which case the temperature may raise in an uncontrollable manner. If this happens, the resultant cured impregnation system may be seriously weakened by porosity and subsequent cracking. Therefore, it is advantage to carry out the polymerization in two controlled steps. The first stage of polymerization is gelation, when the resin starts to crosslink at many sides throughout the windings and is marked by a rapid increase in viscosity. The gelation temperature is typically between 100 and 120° C. and is maintained preferably between 15 minutes to 6 hours, preferably 30 minutes to 3 hours. Subsequently, curing step iii) of the process of the invention is carried out.

According to a preferred embodiment of the present invention the process is carried out as a tickle impregnation. Trickle impregnation is a process for impregnating the windings or coils with the impregnation systems. It is characterized by the fact, that the resin trickles in a continuous stream and at a controlled rate directly onto the windings. It is a process known to the person skilled in the art.

According to a further embodiment of the process of the present invention the process is carried out as a vacuum pressure impregnation (VPI). Vacuum pressure impregnation is a processing technique involving the removal of air, moisture and other contaminants from an air core reactor or a part thereof by means of applied vacuum and the subsequent replacement of these voids with a impregnation system.

After curing the impregnation system according to the process of the present invention impregnated air core reactor or impregnated parts of air core reactor are obtainable which demonstrate an excellent hydrolysis resistance as well as crack resistance.

Therefore, a further embodiment of the present invention is an impregnated air core reactor or an impregnated part of an air core reactor obtainable by the process of the invention.

The impregnation system as defined above has shown excellent properties and suitability for the impregnation of air core reactor or parts of an air core reactor. Therefore, a further embodiment of the present invention is the use of an impregnation system comprising a) one or more component(s) comprising one or more epoxy group(s), b) one or more flexibilizer, c) dicyandiamide; and d) one or more accelerator selected from the group consisting of imidazole, imidazole derivatives, urea derivatives and mixtures thereof, for the impregnation of an air core reactor or parts of an air core reactor.

EXAMPLES

TABLE 1

Raw materials

| Name | Description | Supplier |
|---|---|---|
| Araldite ® CY 30010 CH | solvent free, low viscous bisphenol A epoxy resin with an Epoxy equivalent of 5.45-5.56 Eq/kg | Huntsman, Switzerland |
| Flexibiliser DY 040 | Low viscous, solvent-free Polyglycol | Huntsman, Switzerland |
| Antischaum SH | Silicone based air release agent | Wacker |
| Dyhard ® 100 S | Dicyandiamide | Evonik |
| Dyhard ® UR 500 | (2,4-bis(N1,N1-dimethylureido)toluene) | Evonik |
| Araldite ® F | solvent free, low viscous bisphenol F epoxy resin with an Epoxy equivalent of 5.20-5.30 Eq/kg | Huntsman, Switzerland |
| Aradur ® HY 905 | liquid, modified, carboxylic anhydride curing agent | Huntsman, Switzerland |
| Accelerator DY 9577 | latent accelerator based on $BCl_3$ (semi-solid state) | Huntsman, Switzerland | a) General Production of the Impregnation System

Prior to the application of the impregnation system the components are mixed together. A 1000 g sample can be mixed in a 2.5 l ESCO mixer, equipped with dissolver, anchor agitator, heating and vacuum pump.

1) Comparative Example 1

TABLE 2

Standard impregnation system for air core reactor

| Amount in gram [g] | Component |
|---|---|
| 100 | Araldit ® F |
| 100 | Aradur ® HY 905 |
| 0.6 | Accelerator DY 9577 |

2) Example 1 According to the Invention i) Preparation of First Composition of the Impregnation System A 2.5 l heatable mixer apparatus with a vacuum supply is fitted with a dissolver blade and an anchor stirrer. It is charged with 588.5 g Polypropyleneglycol,
356.0 g Dyhard® 100 S,
55.0 g Dyhard® UR 500 and
0.5 g Antischaum SH.

The ingredients are mixed for 10 min at room temperature with 100 rpm under vacuum (10 mbar) and using the dissolver at 3000 rpm for about 5 minutes. Then the walls are scrapped and the mixture is stirred with 100 rpm afterwards for 30 min under vacuum (10 mbar) at room temperature.

ii) Preparation of Impregnation System of the Invention

1. Transfer the first composition prepared under i) into a mixer
2. Stir up at 25° C. for 30 min
3. Transfer of resin Araldite® CY 30010 CH and the first composition into a mixer
4. Final mixing of impregnation system at 25° C. and 5 mbar for 30 min to 3 h depending on amount. Mixing under vacuum is preferred.

3) Application Process for Impregnation of Air Core Reactors and Subsequent Curing a) Trickle Impregnation 1. Part (coil) is installed in a large trickle impregnation oven.
2. Heating up of part (coil) to 100° C.-110° C. for 90 min
3. Keep oven temperature at 90° C.-100° C. during impregnation process for 30 min to 3 h depending on size of coil.
4. Start injection reactive mixture, during rotation of part in the oven. Impregnation time depending on size of coil (30 min to 3 h)
5. Stop injection of reactive mixture after impregnation periode
6. Heat up part for gelation to 100° C. to 110° C. for 2-3 h
7. For final curing heat part to 145° C. for 10 h b) Vacuum Pressure Impregnation 1. Heating up of part (coil) to 100° C.-110° C. for 90 min
2. Place part in an VPI vessel
3. evacuate part (required vacuum 0.5-5 mbar)
4. Injection of reactive mixture to VPI vessel
5. Impregnation for 30 min to 3 h depending on size of coil
6. After impregnation place part in curing oven
7. Heat up part for gelation to 100° C. to 110° C. for 2-3 h
8. For final curing heat part to 145° C. for 10 h

TABLE 3

Comparison of end properties of cured systems

| | Apparatus/Method | Unit | Comparative Example 1 | Example 1 |
|---|---|---|---|---|
| Viscosity at 60° C. | Rheomat ISO 3219 | mPas | 70 | 170 |
| Viscosity build up to 2000 mPas at 80° C. | Rheomat ISO 3219 | h | 19 | 5 |
| Geltime at 120° C. | Gelnorm ISO 9396 | min | 30 | 22 |
| Glass transition temp. | ISO 11357-2 | ° C. | 105-115 | 118 |
| Tensile strength | ISO 527 | MPa | 40-50 | 76 |
| Elongation at break | ISO 527 | % | 0.9-1.9 | 3.7 |
| Flexural strength | ISO 178 | MPa | 125-135 | 131 |
| Surface strain | ISO 178 | % | 5.4 | 6.9 |
| Bend Notch K1C | ISO 13586 | MPa m$^{1/2}$ | 0.65 | 0.85 |
| G1C | | J/m$^2$ | 159 | 175 |
| Hydrolysis resistance ILSS values after 28 day Pressure cooker | ASTM D2344/00 | MPa | 0 | 20 | c) Proof of the Better Hydrolytic Stability of the Inventive System:

Hydrolysis of the anhydride cured matrix systems (prior art) is relatively slow. For testing purposes, more severe conditions (1 mol/l NaOH at 90° C.) are therefore applied in order to accelerate any potential hydrolysis.

This test offers a measure of the hydrolysis rate (expressed as grams NaOH/(kg·d) under the test conditions). A lower value indicates a higher hydrolysis resistance.

The following systems are compared:

A) A typical anhydride cured epoxy system based on bisphenol-A, cured with the correct hardener ratio (methyl-tetrahydrophthalic acid anhydride)

B) The same anhydride cured epoxy system based on bisphenol-A, but cured with excessive amounts of hardener (methyl-tetrahydrophthalic acid anhydride) as an example of poor processing control C) Example 1 of the invention This test indicates that indeed slight hydrolysis may occur under quite severe conditions with standard epoxy systems. In the case of poor processing control (excessive anhydride) even more hydrolysis took place, which confirms the model mechanisms. Testing gave practical confirmation of the excellent hydrolysis resistance of the impregnation process of the invention, even under the aggressive conditions employed in this test.

FIG. 1 shows the hydrolysis rate of system A, B and C.

d) A second proof of the hydrolysis resistance are the results of a pressure cooker test. In each set 5 with glass fibres reinforced pieces (10 mm×30 mm×4 mm) of System A and System C were cooked under pressure for 7, 14, 21 and 28 days. The aged pieces are then tested regarding adhesion to the fibers with the interlaminar shear test.

Figure 2:
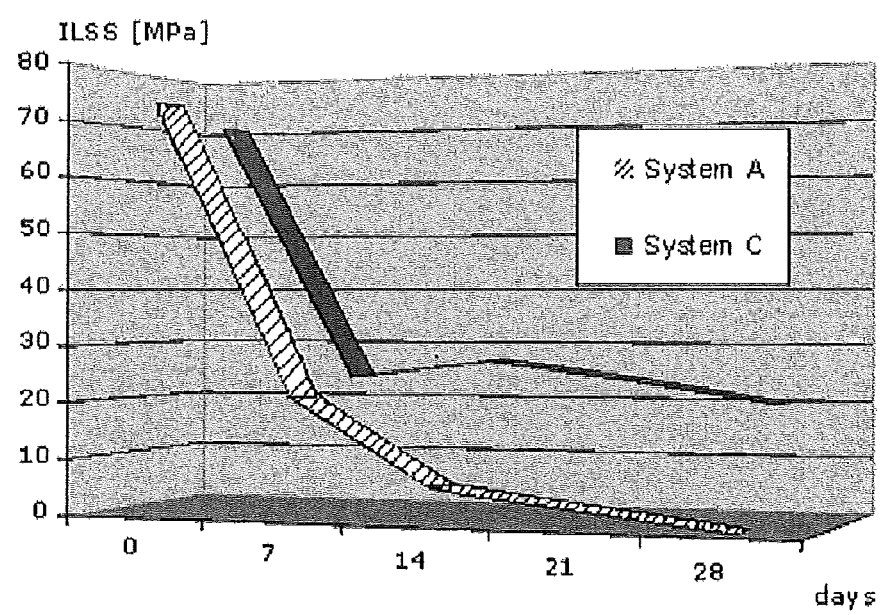

FIG. 2 shows the results of system A and C; ILSS values after pressure cooker treatment.

Figure 3:
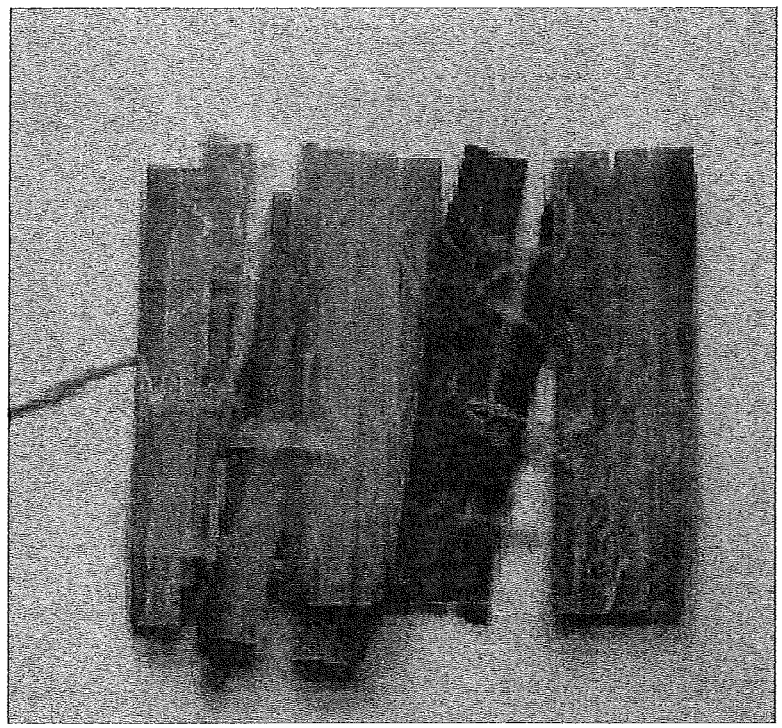

After this severe treatment the matrix system A was completely hydrolyzed (see FIG. 3).

Figure 4:
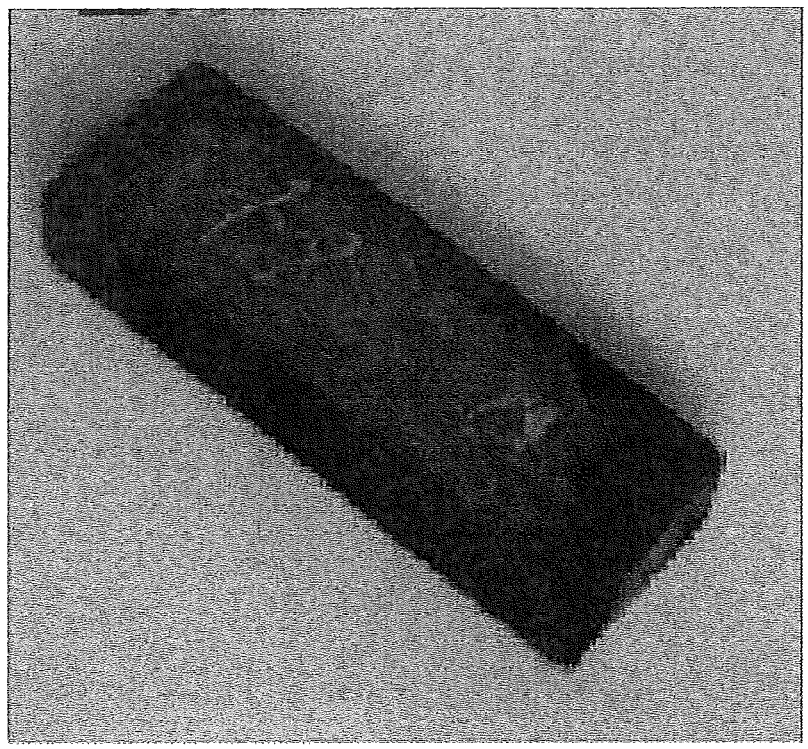

The samples of system C show some decrease of adhesion but they reach a stable level after 7 days of pressure cooker treatment (see FIG. 4).

The invention claimed is:

1. A process for the impregnation of an air core reactor or a part of an air core reactor comprising the following steps:
    i) providing an air core reactor or a part of an air core reactor,
    ii) applying an impregnation system to the air core reactor or the part of the air core reactor wherein said impregnation system comprises
        a) a component comprising one or more epoxy group(s),
        b) a flexibilizer selected from the group consisting of a polyoxyalkylene, a polyether-polyamine and a mixture thereof,
        c) dicyandiamide; and
        d) an accelerator selected from the group consisting of an imidazole, an imidazole derivative, a urea derivative and a mixture thereof,
    iii) curing the impregnated air core reactor or the impregnated part of the air core reactor.

2. The process according to claim 1, wherein the part of the air core reactor is a coil.

3. The process according to claim 1, wherein the a) component is a compound having an average epoxy functionality of at least two.

4. The process according to claim 3, wherein the a) component is a polyglycidylether of a polyhydric alcohol.

5. The process according claim 1, wherein the flexibilizer is a polypropylene glycol or polyethylene glycol.

6. The process according to claim 1, wherein the flexibilizer is present in an amount ranging from 40 to 70 wt. %, based on the amount of the sum of components b), c) and d).

7. The process according to claim 1, wherein the dicyandiamide is present in an amount ranging from 25 to 45 wt. %, based on the amount of the sum of components b), c) and d).

8. The process according to claim 1, wherein the accelerator is present in an amount ranging from 5 to 25 wt. %, based on the amount of the sum of components b), c) and d).

9. The process according to claim 1, wherein the weight ratio of component a) to the sum of components b), c) and d) ranges from 20:1 to 2:1.

10. The process according to claim 1, wherein the impregnation system is applied to the air core reactor or the part of the air core reactor as a two component system of
    A) composition A comprising at least component a) and
    B) composition B comprising at least component b), c) and d).

11. The process according to claim 1, wherein the curing in step iii) is carried out at a temperature higher than 120° C.

12. The process according to claim 1 wherein the impregnation is carried out as a trickle impregnation or a vacuum pressure impregnation.

13. An impregnated air core reactor or part of an air core reactor obtained by the process according to any of claim 1.

* * * * *